June 1, 1943.     LE MOINE WRIGHT     2,320,691
RUBBER PRODUCT AND METHOD OF MAKING SAME
Filed Jan. 31, 1940

INVENTOR.
BY LeMoine Wright.
ATTORNEY.

Patented June 1, 1943

2,320,691

UNITED STATES PATENT OFFICE 2,320,691

RUBBER PRODUCT AND METHOD OF MAKING SAME

Le Moine Wright, Worcester, Mass.

Application January 31, 1940, Serial No. 316,627

3 Claims. (Cl. 117—7)

This invention relates to a rubber product and to the method of processing hydro-chlorinated isoprene to produce such rubber product.

The primary object of the invention is to further treat the whole area of a product having the properties of a hydro-chlorinated fiber to substantially overcome the inert qualities thereof so as to comply to a stretching operation for final manufacture into desirable rubber articles.

A further object of the invention is to treat a product, such as hydro-chlorinated isoprene stock, in the presence of paraffin, to increase the elasticity of the stock in preparation for subsequent stretching and formation thereof into string, thread and the like.

Another object of the process of the invention is to subject hydro-chlorinated isoprene stock in ribbon, or other form, to the action of heated paraffin, or heated paraffin and oil, or oils in solution such, for instance as castor oil and/or mineral oil, to prepare the stock molecules for subsequent stretching of the stock into string, thread or into other desirable form for the manufacture of various rubber articles therefrom where it is desirable that the stock be strong, durable, substantially inextensible, and highly efficient for the purposes intended.

It has been discovered that heated paraffin alone is particularly advantageous in treating hydro-chlorinated isoprene stock, in ribbon or sheet form, because it acts to re-arrange the rubber molecules, or substantially overcomes the inert qualities of the rubber fibers of the stock, which is desirable to a subsequent stretching of the stock into material for subsequent use in the manufacture of various rubber products, and by the addition of oil or oils to the heated liquid paraffin, surplus paraffin is more conveniently removed as a surface coating for the hydrochlorinated isoprene stock, thereby preventing undue paraffin accumulating on forming rolls in the manufacture of string and the like from the stock so treated.

The invention accordingly comprises the improved string, or other unit or article, and a process having the steps and the relation of steps, one to the other, all as exemplified in the following detailed description and the scope of the application of which will be indicated in the claims.

For a more complete understanding of the nature and objects of the invention, reference should be had to the accompanying drawing, in which.

Figures 1, 2:
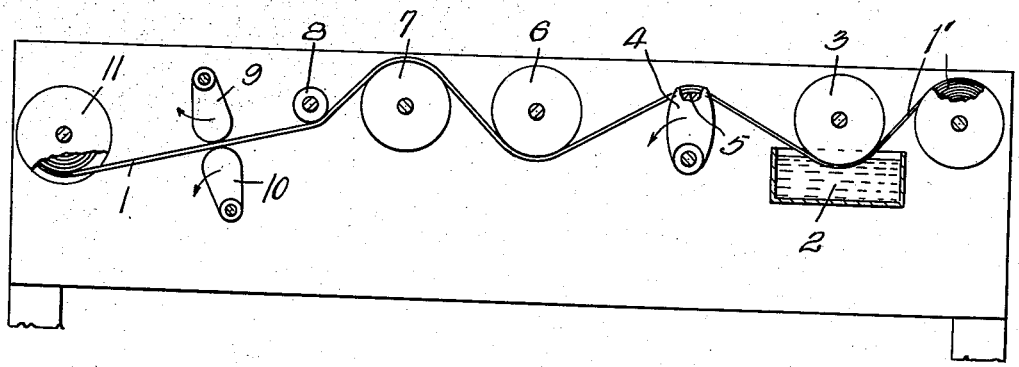
Fig. 1 is a side elevation of a piece of hydrochlorinated rubber processed to form a piece of string, which is enlarged.
Fig. 2 is a diagrammatic view of mechanism for carrying out the process, or method of making string, or the like, from hydro-chlorinated rubber which has been heat treated in the presence of heated paraffin, or paraffin and oil.

In one embodiment of the process of the invention, it is carried out by first subjecting a hydrochlorinated isoprene stock, in ribbon form, to the action of a heated hydro-carbonaceous mixture chiefly of the methane series such, for instance as heated paraffin, which acts to substantially overcome the inert qualities of the hydro-chlorinated isoprene fibers in preparation for a stretching operation; second, stretching the stock so as to be substantially inextensive, and simultaneously therewith, or subsequently forming, twisting, or curling the stock laterally particularly in the manufacture of string, thread, and the like, drying the stock, and then winding the stock onto a spool.

In another embodiment of the process of the invention, it is carried out as above described, except that the hydro-chlorinated stock is subjected to the heated action of heated paraffin and oil, or oils such, for instance, as castor oil, or mineral oil, or both. The oils included in the paraffin bath tend to increase the elasticity of the stock and aid in removing surplus paraffin as a surface coating to the stock to prevent undue accumulation of paraffin on string, or other forming rolls.

I have found that paraffining hydro-chlorinated rubber stock, renders the ribbon stock so processed stretchable in the process of making string, or the like, and leaves the product after stretching substantially inextensive in finished form, and free from any tendency to become brittle, or subject to surface cracking. While the processed stock is substantially inextensible, it is flexible and somewhat resilient after being formed into various types of articles.

Referring to Fig. 1 of the drawing, the processed hydro-chlorinated rubber stock is shown in the form of string and designated I.

Referring to Fig. 2, which discloses one embodiment of a continuous process of making a string product from hydro-chlorinated rubber ribbon stock, the steps of processing the stock comprises continuously passing ribbon rubber stock designated I' from a spool into and through a heated solution 2, under a roller 3, of paraffin or any paraffin derivative, or through a heated solution of paraffin or paraffin derivative and oil, so that the stock will be subjected from all sides to the action or penetrating powers of the solution to block stock resistance during a subsequent and predetermined amount of elongation. From here, the paraffined stock is stretched by suitable means such, for instance, by a rotary crank-like arm 4, provided with, or without, a facial string forming groove 5, which periodically engages the paraffined stock, lifts and stretches the same between the roller 3, and a second roller 6. The crank-like arm 4 is indicated as running in an anti-clockwise direction, and the paraffined stock 1' is curled into string formation 1 when a roller groove 5 is provided. The paraffined rubber stock continues over and under a series of rollers 7 and 8 to effect wax removal and drying of the stock. From roller 8, the processed stock, if in the form of string, or otherwise formed, moves on to a further position, which can be a final stretching of the stock by being gripped between two rotatable cams, or walkers 9 and 10, which act as elements to periodically pull on the processed stock and then release the same before being wound around a suitable roller 11. If a final stretching of the stock is not desirable, the stock can pass directly from roller 8 to the roller 11.

If there is a paraffin surface coating on the resultant product, it is very thin.

While I have described a process of making string from hydro-chlorinated isoprene by a continuous process from ribbon stock, it is apparent that hydro-chlorinated rubber in other forms and shapes can be likewise processed, as the stock may be in sheet, died out, or other shapes or forms, and the heated paraffin, or paraffin and oil can be applied to the surface areas of stock by dipping, spraying or in any suitable manner so as to subject the stock to the action of the heated paraffin, or heated paraffin and oil. I have found that various products, such, for instance, as string, or cord by twisting several strands of strings together, artificial flowers and many other products can be made from hydrochlorinated rubber processed as hereinbefore described.

According to the present invention, thread or other products can be formed by processing hydro-chlorinated isoprene, or rubber, in ribbon or other shape and surface treating the stock with heated paraffin alone, or with heated paraffin and oil or oils in solution, and with, or without coloring matter, either by passing the hydro-chlorinated rubber stock through a bath, spraying, dipping, or otherwise liquid heat treating the rubber stock through a heat process so as to overcome the inert qualities of the rubber fiber by setting the rubber molecules in motion, or rearranging the same prior to a stretching process or operation.

Since certain changes may be made in the method and article, and particularly manifest to those skilled in the art to which the invention relates, such as different embodiments of the invention without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described and all statements of the scope of the invention which as a matter of language might be said to fall therebetween.

What I claim is:

1. The process of altering rubber hydrochloride stock which is naturally non-elastic to a state of rubber hydrochloride elastic so as to preserve it in such latter state for dry storage for subsequent use without fear of deterioration by exposure to the elements, which consists in heat penetrating the rubber by heated paraffin to block resistance thereof to stretching, thereafter initially stretching the rubber, removing surface paraffin thereon, and again stretching the treated hydrochlorinated rubber.

2. The process of progressively subjecting all of the surfaces of dry hydrochlorinated rubber strip stock unwound from a roll to the heat penetrating action of a bath of liquid paraffin heated to a degree short of rendering the paraffin heated hydrochlorinated rubber tacky and to block resistance thereof to elongation, stretching the hydrochlorinated rubber between rollers after leaving the paraffin bath, and removing any wax adhering to the surfaces of the rubber after stretching, and finally rewinding the stretched hydrochlorinated rubber.

3. The process of treating dry hydrochlorinated rubber with heated paraffin to block resistance thereof to stretching, stretching the heated hydrochlorinated rubber and removing surface paraffin adhering thereto whereby there is produced a rubber hydrochloride product of improved quality capable of being placed in dry storage without fear of deterioration.

LE MOINE WRIGHT.